(12) United States Patent
Endal et al.

(10) Patent No.: US 10,655,757 B2
(45) Date of Patent: May 19, 2020

(54) APPARATUS AND METHOD FOR DIRECT TIE-IN OF SUBSEA PIPELINES

(71) Applicant: EQUINOR ENERGY AS, Stavanger (NO)

(72) Inventors: Geir Endal, Jessheim (NO); Per R. Nyström, Sandnes (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 16/078,452

(22) PCT Filed: Feb. 22, 2016

(86) PCT No.: PCT/NO2016/050032
§ 371 (c)(1),
(2) Date: Aug. 21, 2018

(87) PCT Pub. No.: WO2017/146582
PCT Pub. Date: Aug. 31, 2017

(65) Prior Publication Data
US 2019/0056043 A1    Feb. 21, 2019

(51) Int. Cl.
| F16L 1/26 | (2006.01) |
| E21B 43/013 | (2006.01) |
| F16L 1/20 | (2006.01) |
| F16L 1/19 | (2006.01) |

(52) U.S. Cl.
CPC ............. *F16L 1/26* (2013.01); *E21B 43/013* (2013.01); *F16L 1/19* (2013.01); *F16L 1/20* (2013.01)

(58) Field of Classification Search
CPC combination set(s) only.
See application file for complete search history.

(56) References Cited

U.S. PATENT DOCUMENTS

| 4,075,862 A | 2/1978 | Ames |
| 4,459,065 A | 7/1984 | Morton |
| 4,615,646 A | 10/1986 | Langner |
| 6,481,504 B1 * | 11/2002 | Gatherar ................... F16L 1/26 166/344 |

(Continued)

FOREIGN PATENT DOCUMENTS

| WO | WO 02/057674 A1 | 7/2002 |
| WO | WO 2011/043671 A1 | 4/2011 |
| WO | WO 2015/149843 A1 | 10/2015 |

OTHER PUBLICATIONS

International Search Report, issued in PCT/NO2016/050032, dated Sep. 14, 2016.

(Continued)

*Primary Examiner* — Kyle Armstrong
(74) *Attorney, Agent, or Firm* — Birch, Stewart, Kolasch & Birch, LLP

(57) ABSTRACT

A method of installing a subsea pipeline having a direct tie-in to a subsea structure includes landing an end of a pipeline onto a pipeline landing frame, the pipeline landing frame being on a surface of a subsea structure, the pipeline landing frame providing a location for landing the end of the pipeline before connection to a connection point of the subsea structure; subsequently lowering the pipeline end; and connecting the pipeline end to a connection point of the subsea structure. A pipeline landing frame for implementing the method is also described.

18 Claims, 2 Drawing Sheets

(56) References Cited

U.S. PATENT DOCUMENTS

2008/0014026 A1    1/2008  Routeau et al.
2011/0150576 A1    6/2011  Alliot
2015/0345274 A1*  12/2015  Sathananthan ....... E21B 43/017
                                                                210/737

OTHER PUBLICATIONS

Written Opinion of the International Searching Authority, ssued in PCT/NO2016/050032, dated Sep. 14, 2016.

* cited by examiner

APPARATUS AND METHOD FOR DIRECT TIE-IN OF SUBSEA PIPELINES

TECHNICAL FIELD

The present invention relates the deployment and direct tie-in of subsea pipelines used for the transportation of hydrocarbons.

BACKGROUND

Pipelines for the transport of hydrocarbons, e.g. oil or gas, are typically laid along the seabed using a laying vessel. Such subsea pipelines can be installed between, for example, two subsea structures, where the subsea structures may be "Christmas trees", riser bases, Blowout Preventers (BOPs), or some other structures. Often one or both ends of the pipeline are connected (or "tied-in") to a subsea structure using a separate jumper or spool. The extra components and procedures associated with the use of separate jumpers or spools result in high costs for the installation process. Direct tie-in methods can also be used and are often preferable. These methods include:
  direct pull-in, in which an end of the pipeline is pulled close to the subsea structure using a winch location on the laying vessel, and the tie-in is completed using a remotely operated vehicle (ROV) and alignment apparatus;
  deflect to connect, in which a wire is attached to the end of the pipeline, where the wire is routed through the subsea structure to a winch, and the wire is used to pull the subsea end of the pipeline directly to the subsea structure; and
  connect and lay-away, in which the subsea end of the pipeline is connected to the subsea structure at the surface, and the subsea structure is then lowered to the seabed before the laying vessel lays the pipeline by stepping away from the subsea structure.

During tie-in to a sub-sea structure, significant forces will be required to move an as-laid pipeline axially towards the connection point due to parameters such as pipeline axial stiffness, submerged weight, seabed friction resistance etc. Thus, the main challenges for conventional direct tie-in methods are relatively large forces on the connection and large pipeline stresses close to the connection point.

A typical approach to pipe laying will involve careful design of the subsea structure and of the pipeline configuration in order to ensure that, when laid, the tie-in end of the pipeline is in the correct location and orientation with respect to the connector on the subsea structure. During the direct tie-in process, a very high tensile force is applied to the end of the pipeline, putting the pipeline under tension, in order to bring the end of the pipeline up to the connection point and complete the tie-in process. One of the reasons to put the installed pipe under tension is in order to allow for subsequent thermal expansion of the pipe that can occur during use. Without such tension, a pipeline may buckle as a result of the thermal expansion.

The forces applied to the pipeline during direct tie-in can be very high indeed. This makes high demands of the installation equipment and pipeline structure. Furthermore, at least in the absence of some compensating mechanism, the forces can cause damage to the pipeline and to the connector on the subsea structure.

In co-pending application WO-A-2015/149843 to the present applicant, is disclosed a method of installing a subsea pipeline having a direct tie-in to a subsea structure. The method comprises, during introduction of the pipeline into the sea from a pipe laying vessel, applying a plastic deformation to a region of the pipeline at or close to an end of the pipeline to be tied-in and, either during or following tie-in, elastically deforming said region to increase its radius of curvature.

A pipeline to be laid on the seabed may be transported on and deployed from a laying vessel. In the case that a substantially inflexible pipeline (for example, steel) is stored on a reel on the laying vessel, it is typically necessary to straighten the pipeline as it is deployed, to remove any residual curvature produced by storing the pipeline on the reel or bending it over the stinger. This is achieved using curvature means that plastically deforms the pipeline to remove the residual curvature.

As described above, the installation of such straightened pipelines using direct tie-in methods can result in large forces during and following the completion of the connection between an end of a pipeline and a subsea structure, and large stresses in the section of the pipeline near the end of the pipeline. Furthermore, a large area is required for routing the pipeline to the subsea structure, to accommodate the lateral deflection of the pipeline required to align the end of the pipeline with a connection point on the subsea structure. The approach presented in WO-A-2015/149843 mitigates these problems by using the method of WO-A-02/057674 to create a radius of curvature in a section of the pipeline adjacent to the subsea end of the pipeline (creating a "tie-in and thermal expansion loop").

Local residual curvature may also be generated with S-lay vessels during installation, by 1) adjusting roller(s) or 2) by adjusting the stinger configuration with the pipeline in place. Generation of local residual curvature may also be feasible on other S-lay barges by modification to one or two of the stinger rollers, enabling adjustment whilst laying.

In operation, a pipeline will expand under the high pressures and temperatures that can be associated with the transport of, for example, oil or gas. In the case of a generally straight configuration between, for example, two subsea structures that are fixed on the seabed, such thermal expansion (which will result in an increased pipeline length) will result in compressive forces on the pipeline. These compressive forces may be significant and, in the absence of some control mechanism, can cause the pipeline to buckle at unpredictable locations, resulting in the deformation and possible collapse of the pipeline in the horizontal or vertical plane.

In conventional installation methods the pipeline is placed under tension as it is deployed from the laying vessel, due to both the weight of the pipe itself and the forward motion of the laying vessel. This tensile force results in an axial elastic extension in the pipeline, and because the pipeline does not regain its original length before the installation process is complete, the installed pipeline remains under tension. This pre-existing tension in the pipeline mitigates the effects of the longitudinal expansion in the operational pipeline; however, the resulting compression forces may still be large enough to cause buckling. Further measures that are commonly used to protect against the buckling of a pipeline include burying the pipeline in a trench or placing it in an open trench, covering the pipeline with gravel, laying the pipeline along a snaked route, laying the pipeline in a larger casing, and including expansion loops in the pipeline along its length. These methods may be expensive, and may leave uncertainty regarding the likelihood and possible location of buckling in the pipeline.

In FIG. 1 a first end tie-in procedure is illustrated: the pipeline 1 can be initiated against a return sheave arrangement 100 on the subsea structure 5 and lowered/docked in a controlled manner onto a guide post/landing frame etc. depending on the tie-in system being employed. The initiation wire 7 extends from the pipeline end terminal (PLET) 101, through the sheave arrangement 100 and back to a winch (not shown) on the lay vessel. The lay vessel is also not shown for clarity.

When the end of the pipeline 1 is close enough to the subsea structure 5, the final stages of the direct tie-in process are completed using a remotely operated vehicle (ROV) 9. In this case ROV 9 is provided from an installation vessel, but the ROV could also be associated with the laying vessel.

A residual curvature section 102 is shown introduced approximately 100 m away from the pipeline end. A wire tensioning system 103 using a standard torque tool is considered to be an efficient method if it is necessary to retract the pipeline end 101 in a controlled manner and to maintain a stable pre-bent section.

Hub capacity is often seen to be a governing factor for pipeline tie-ins using diverless systems. Since hubs on subsea templates typically could be elevated 2.5 m above the seabed floor, vertical alignment between pipeline end and the hub is a key parameter. In order to compensate for this, the hub can typically be tilted slightly downwards, say 3°, 5° or 7°. However, further vertical alignment will in many cases be needed. This has on several projects been solved by introducing rock supports 104 or adjustable mechanical supports in the adjacent free span. After the pipeline is pulled down and safely landed in the tie-in porch/landing frame, the pipeline is ready for the final stroke-in and finally the clamp connector is made up and the seal can be tested. The new generation tie-in systems HCCS, HCS and UCON, are based on landing the termination head into the porch, letting the ROV stroke the hubs together by the temporary stroking tool and engage the connector.

Since in prior techniques the pipeline typically will have to be laid adjacent to the subsea structure, after which a lift- and shift operation of the pipeline is required, with proper adjustment of the axial lay tolerance, prior to the tie-in/ connection operation. The lift and shift operation normally has to be performed after water filling the pipeline, and after removal of a temporary pig trap. Some additional vessel time is required to do this work, prior to the actual tie-in/ connection operation.

SUMMARY

It is an object of the present invention to overcome or at least mitigate the disadvantages of known direct tie-in procedures.

In a first aspect the invention provides a method of installing a subsea pipeline having a direct tie-in to a subsea structure comprising, landing an end of a pipeline on a pipeline landing frame on a surface of a subsea structure, the pipeline landing frame providing a location for landing an end of a pipeline before connection to a connection point of the subsea structure, subsequently lowering the pipeline end, and connecting the pipeline end to a connection point of the subsea structure.

The pipeline landing frame may be a temporary pipeline landing frame configured to be fitted to an surface of a subsea structure. The pipeline landing frame may be integral with a subsea structure.

The pipeline may be temporarily installed on the pipeline landing frame.

The method may further comprise flooding the pipeline in position on the landing frame.

The method may further comprise removing a pig trap from the pipeline in position on the landing frame.

The step of lowering the pipeline may comprise lowering both the pipeline and the pipeline landing frame. The step of lowering may comprise raising the pipeline off the pipeline landing frame before lowering the pipeline.

An axial adjustment to the pipeline position may be effected before connection to the connection point by a mechanism in the landing frame. An axial adjustment to the pipeline position may be effected before connection to the connection point by pulling or winching laterally on the pipeline. The pulling or winching may be effected at a point approximately 50 m to 200 m away from the connection point.

The pipeline landing frame includes a guide structure for guiding the pipeline into a landed position on the pipeline landing frame.

In a second aspect, the invention provides a pipeline landing frame configured to be fitted to an surface of a subsea structure and providing a location for landing an end of a pipeline before connection to a connection point of the subsea structure.

In a third aspect, the invention provides a subsea structure comprising a pipeline landing frame integral with the subsea structure and providing a location for landing an end of a pipeline before connection to a connection point of the subsea structure.

A pipeline landing frame or subsea structure according to the invention may comprise a guide structure for guiding an end of a pipeline to a landing position on the pipeline landing frame.

The above mentioned surface of the subsea structure will generally be an upper surface thereof. By upper surface is meant a surface that may be substantially parallel to the sea bed when the subsea structure is in position on the sea floor and is generally on top of the subsea structure in position on the sea floor. The surface need not be the uppermost surface or parallel to the sea bed, however, and it is sufficient that the surface is accessible from above when the subsea structure is in position on the sea floor. Arguably, the PLF may be affixed to any surface (for example a side surface), so long as once in position it provides a generally accessible location for landing the end of a pipe.

DETAILED DESCRIPTION

As described above in relation to the background art, it is known to initiate direct tie-in of a pipeline to a subsea structure, by landing the end of the pipeline near the subsea structure and "stroking" the end to the hub or connection point for sealing with the chosen clamp connector.

In the present invention, the end of the pipeline is landed on pipeline landing frame located on top of the subsea structure. The main idea of this invention is to enable installing the pipeline end temporarily directly on the top of the subsea template (or other subsea structure) to which the subsequent direct tie-in is to be performed. This means that the pipeline is installed directly in its correct corridor and position; furthermore, the pipeline end is temporarily installed on the top of the structure such that the pipeline pig-trap or PLET does not crash into the subsea structure.

The invention enables laying the pipeline straight into position for direct tie-in, and makes temporary installation adjacent to the structure, involving later lift and shift operation, superfluous.

The invention gives low forces on the tie-in hub/connection, as lateral deflection of the pipeline towards the end of the pipeline ensures low axial force to cause lateral deflections under varying operating loads. The invention is a simplification that will enable direct tie-in on most pipeline ends to subsea structures.

It is expected that there will be considerable cost saving compared with a conventional method using rigid spools or flexible tails. The invention also gives considerable schedule savings, and improves HSE (Health, Safety and Environmental) due to fewer offshore lifting operations and reduced risk.

Figure 1:
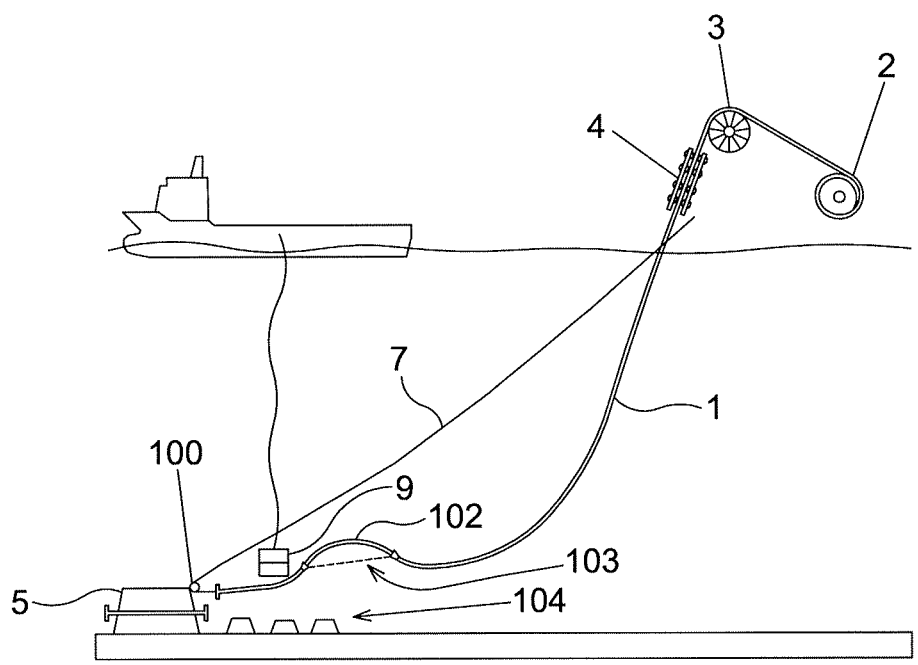
FIG. 1 illustrates schematically a typical initiation in a first end direct tie-in using a residual curvature method.
Figure 2:
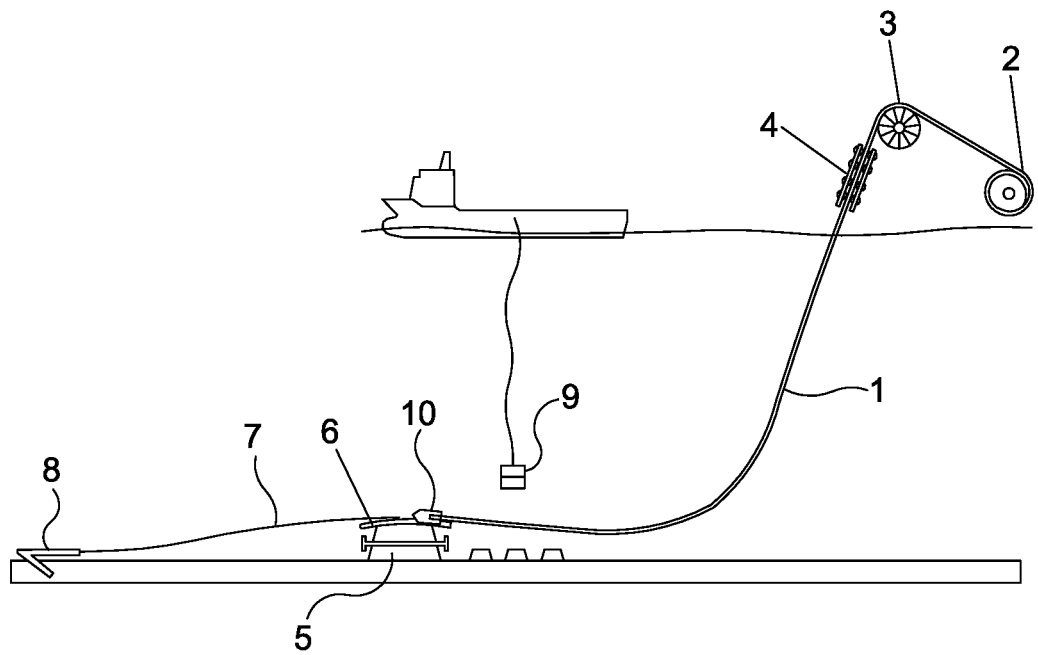
FIG. 2 illustrates schematically a process of deploying a pipeline 1 from a pipeline reel, in accordance with the present invention.

FIG. 2 illustrates schematically a laying vessel that is in the process of deploying a pipeline 1 from a pipeline reel 2. For convenience the vessel itself is not shown. The pipeline 1 is bent over an aligner 3 as it is deployed from the pipeline reel 2. For large sections of the pipeline 1 the straightener 4 is used to remove the residual radius of curvature that results from the storage of the pipeline 1 on the pipeline reel 2 and bending over the aligner 3.

Figure 3:
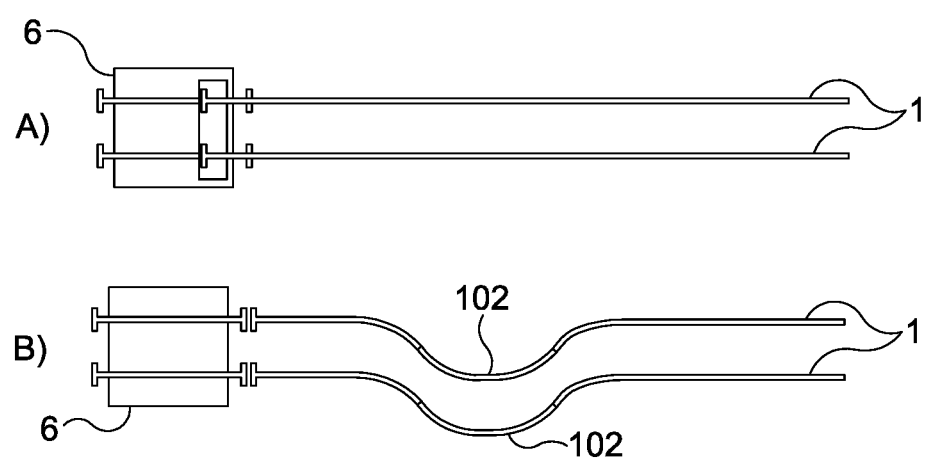
FIG. 3A shows the ends of two pipelines temporarily installed on the PLF.
FIG. 3B shows the end of two pipelines connected to two connection points of a subsea structure after an axial adjustment by pulling on the pipelines to generate residual curvature sections.

In an embodiment of the invention the end of the pipeline, including a tie-in and thermal expansion loop, optionally in accordance with one of WO-A-02/057674 or WO-A-2015/149843, is directly connected to a subsea structure 5 using a direct tie-in method, as described below with reference to FIGS. 2 and 3.

The subsea structure 5 is provided with a pipeline landing frame (PLF) 6, which may be a temporary PLF 6 secured to the top of the subsea structure 5 or an integrated PLF 6 formed in or on the roof of the subsea structure 5. The PLF 6 is new and will be described in more detail below. For the purposes of describing the method, it is sufficient that the PLF 6 provide a location for landing an end of a pipeline 1 before connection. The pipeline is shown with a pig trap 10 at its end.

The end of the pipeline 1 is pulled close to the subsea structure 5 using, for example, an initiation wire 7 extending from a laying vessel. In FIG. 2, the initiation wire extends from the initiation head/PLET (not shown) through or over the PLF to a seabed anchor 8. Any convenient means of landing the pipeline end on the PLF can be used. The pipeline end may be landed on the PLF using divers, Remotely Operated Vehicles (ROVs) 9, initiation wires having different arrangements, and any combination of such techniques.

When the end of the pipeline 1 is close enough to the subsea structure, the final stages of the direct tie-in process are completed in the embodiment using a ROV 9.

Landing the pipeline end on top of the subsea structure can be enabled in different ways:
1) A temporary Pipeline Landing Frame (PLF) on top on top of the subsea structure. The temporary PLF may have guiding system (e.g. funnels) to ensure the pipeline entering in the correct position.
2) A Pipeline Landing Frame (PLF) integrated in the roof of the subsea structure. The integrated PLF may have guiding system (e.g. funnels) to ensure the pipeline entering in the correct position.

After pipeline installation, the pipeline is flooded (water filled), the pig trap is removed, and the pipeline end is to be lowered down from the PLF on the roof to the subsea structure for direct tie-in. The lowering may be performed in alternative ways:
1) The PLF with the pipeline end are both lowered down to the main structure below, or
2) The PLF is removed by temporarily lifting the pipeline end slightly, after which the pipeline end is lowered down in position for connection.

As demonstrated in FIG. 3, prior to or during the lowering operation above, the axial position of the pipeline end is adjusted to match the position of the connection point on the subsea structure below. This axial adjustment may also be performed by a mechanism in the landing frame, or it may be made by pulling/winching laterally on the pipeline for example 50m to 200 m away from the connection point. The latter has the advantage that the laterally deflected section will act as a spring during operation, where thermal expansion is absorbed by lateral deflection, hence ensuring that the loads on the connection point are acceptable.

FIG. 3A shows the ends of two pipelines temporarily installed on the PLF. FIG. 3B shows the end of the two pipelines 1 connected to two connection points of the subsea structure after an axial adjustment by pulling on the pipelines to generate the residual curvature sections 102.

The pulling may be effected by a further winch, by tension cable, by buoyancy aids, or a combination of these and any other convenient method.

In an embodiment, the PLF 6 comprises a guiding structure for guiding the end of a pipeline to a landing position, such as that shown in FIG. 3A. The residual curvature portion 102 is generated by pulling on the pipeline and the PLF guide structure allows movement from the landing position shown in FIG. 3A to a second position axially above the appropriate connection point shown in FIG. 3B. In this case the PLF may include a mechanism either for lowering the, or each, pipeline-end to a connection point, or alternatively a release mechanism so that the pipeline can be lowered by some other means, for example, by a diver or ROV.

It will be appreciated by the person of skill in the art that various modifications may be made to the above described embodiments without departing from the scope of the present invention.

The invention claimed is:

1. A method of installing a subsea pipeline having a direct tie-in to a subsea structure comprising: landing a pipeline end of a pipeline onto a pipeline landing frame, wherein the pipeline landing frame is located on a top surface of a subsea structure and provides a temporary landing location for landing the pipeline end of the pipeline before connection of the pipeline end to a connection point of the subsea structure; subsequently lowering the pipeline end from the temporary landing location to a direct tie-in connection position; and connecting the pipeline end in the direct tie-in connection position to the connection point of the subsea structure by a direct tie-in, wherein the step of landing the pipeline end comprises landing a distal end of the pipeline on the pipeline landing frame on the top surface of the subsea structure, and the step of subsequently lowering the pipeline end comprises lowering the distal end of the pipeline to the direct tie-in connection position at a location below the top surface of the subsea structure, and further comprising the step of: after the step of landing the pipeline end and before the step of subsequently lowering the pipeline end, adjusting an axial position of the pipeline end to match the direct tie-in connection position that is below the top surface of the subsea structure such that a residual curvature section is formed in the pipeline.

2. The method of claim 1, wherein the pipeline landing frame is a temporary pipeline landing frame configured to be fitted to a surface of a subsea structure.

3. The method of claim 1, wherein the pipeline landing frame is integral with a subsea structure.

4. The method of claim 1, wherein the pipeline is temporarily installed on the pipeline landing frame.

5. The method of claim 1, further comprising flooding the pipeline in position on the landing frame.

6. The method of claim 1, comprising removing a pig trap from the pipeline in position on the landing frame.

7. The method of claim 1, wherein the step of lowering the pipeline comprises lowering both the pipeline and the pipeline landing frame.

8. The method of claim 1, wherein the step of lowering comprises raising the pipeline off the pipeline landing frame before lowering the pipeline.

9. The method of claim 1 wherein an axial adjustment to the pipeline position is effected before connection to the connection point by a mechanism in the landing frame.

10. The method of claim 1, wherein an axial adjustment to the pipeline position is effected before connection to the connection point by pulling or winching laterally on the pipeline.

11. The method of claim 10, wherein the pulling or winching is effected at a point approximately 50 m to 200 m away from the connection point.

12. The method of claim 1 wherein the pipeline landing frame includes a guide structure for guiding the pipeline into a landed position on the pipeline landing frame.

13. The subsea structure as claimed in claim 1, wherein the step of adjusting is performed by a mechanism in the pipeline landing frame.

14. The subsea structure as claimed in claim 1, wherein the step of adjusting is performed by pulling or winching laterally on the pipeline.

15. A pipeline landing frame configured to be fitted to a top surface of a subsea structure and providing a temporary landing location for landing an end of a pipeline before connection to a connection point of the subsea structure, wherein the pipeline landing frame is located on the top surface of the subsea structure, and provides the temporary landing location above the top surface of the subsea structure for landing the end of the pipeline before lowering the end of the pipeline from the pipeline landing frame to a connection point of the subsea structure for a direct tie-in connection, said connection point being below the top surface of the subsea structure, and further comprising the step of: after the step of landing the pipeline end and before the step of subsequently lowering the pipeline end, adjusting an axial position of the pipeline end to match the direct tie-in connection position that is below the top surface of the subsea structure such that a residual curvature section is formed in the pipeline.

16. The pipeline landing frame as claimed in claim 15, wherein the pipeline landing frame comprises a guide structure for guiding an end of a pipeline to a landing position on the pipeline landing frame.

17. A subsea structure comprising a pipeline landing frame integral with the subsea structure and providing a temporary landing location for landing an end of a pipeline before connection to a connection point of the subsea structure, wherein the pipeline landing frame is located on a top surface of the subsea structure, and provides the temporary landing location above the top surface of the subsea structure for landing the end of the pipeline before lowering the end of the pipeline from the pipeline landing frame to the connection point of the subsea structure for a direct tie-in connection, said connection point being below the top surface of the subsea structure, and further comprising the step of: after the step of landing the pipeline end and before the step of subsequently lowering the pipeline end, adjusting an axial position of the pipeline end to match the direct tie-in connection position that is below the top surface of the subsea structure such that a residual curvature section is formed in the pipeline.

18. The subsea structure as claimed in claim 17, wherein the pipeline landing frame comprises a guide structure for guiding an end of a pipeline to a landing position on the pipeline landing frame.

* * * * *